United States Patent
Ueda et al.

(10) Patent No.: US 6,841,305 B2
(45) Date of Patent: Jan. 11, 2005

(54) NON-AQUEOUS ELECTROLYTE BATTERY AND NON-AQUEOUS ELECTROLYTE

(75) Inventors: Atsushi Ueda, Osaka (JP); Kazuya Iwamoto, Sakai (JP); Hiroshi Yoshizawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/863,463

(22) Filed: May 24, 2001

(65) Prior Publication Data

US 2002/0009652 A1 Jan. 24, 2002

(30) Foreign Application Priority Data

May 31, 2000 (JP) ........................................ 2000-162008

(51) Int. Cl.[7] .............................................. H01M 6/16
(52) U.S. Cl. ...................... 429/328; 429/199; 429/332; 429/339
(58) Field of Search ................................ 429/328, 339, 429/199, 188, 326, 332

(56) References Cited

U.S. PATENT DOCUMENTS 6,372,388 B1 * 4/2002 Katsurao et al. ............ 429/316
6,384,321 B1 * 5/2002 Mikoshiba et al. .......... 136/263
6,395,429 B1 * 5/2002 Kang et al. .................. 429/306

FOREIGN PATENT DOCUMENTS

| JP | 07192757 A | * | 7/1995 | .......... H01M/10/40 |
| JP | 2000348765 A | * | 12/2000 | .......... H01M/10/40 |
| JP | 2001057234 A | * | 2/2001 | .......... H01M/10/40 |

* cited by examiner

Primary Examiner—Patrick Ryan
Assistant Examiner—Tracy Dove
(74) Attorney, Agent, or Firm—Stevens, Davis, Miller & Mosher, LLP

(57) ABSTRACT

A non-aqueous electrolyte battery excellent in high-temperature storage characteristics is provided by adding to the non-aqueous electrolye a compound represented by the following formula:

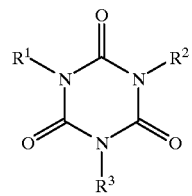

in the above formula, $R^1$, $R^2$ and $R^3$ independently represent a hydrogen atom, a halogen atom or a straight chain or branched chain alkyl group.

12 Claims, 2 Drawing Sheets

NON-AQUEOUS ELECTROLYTE BATTERY AND NON-AQUEOUS ELECTROLYTE

BACKGROUND OF THE INVENTION

1. Field of the Invention

The present invention relates to a non-aqueous electrolyte battery, and, particularly, to an improvement of a non-aqueous electrolyte.

2. Description of Related Art

At present, as organic solvents which constitute non-aqueous electrolytes for non-aqueous electrolyte batteries, there are used, for example, ethylene carbonate, propylene carbonate, butylene carbonate, dimethyl carbonate, diethyl carbonate, ethylmethyl carbonate, dipropyl carbonate, methyl propionate, tetrahydrofuran, 1,3-dioxolan, and 1,2-dimethoxyethane each alone or in admixture. As electrolyte salts, there are used, for example, $LiClO_4$, $LiBF_4$, $LiPF_6$, $LiCF_3SO_3$, and $(CF_3SO_2)_2NLi$ each alone or in admixture. Especially, carbonic acid esters are mainly used as organic solvents and $LiPF_6$ is mainly used as electrolyte salts because they are superior in conductivity and are safe for environments.

BRIEF SUMMARY OF THE INVENTION

However, when batteries made using non-aqueous electrolytes comprising the above organic solvents and electrolyte salts are stored in charged state, electrode materials react with the organic solvents and the electrolyte salts to cause decomposition of the non-aqueous electrolytes, and, as a result, capacity of the batteries after stored tends to decrease. Especially, in secondary batteries which are made using carbon materials as negative electrode materials, occurrence of reduction reaction at negative electrodes is accelerated and said tendency becomes more conspicuous.

The object of the present invention is to provide a non-aqueous electrolyte battery which is inhibited from the deterioration of non-aqueous electrolyte when stored in charged state, especially, the occurrence of reaction between the negative electrode materials and the non-aqueous electrolyte and, thus, which has excellent storage characteristics.

For attaining the above object, the present invention provides a non-aqueous electrolyte battery having a positive electrode, a negative electrode and a non-aqueous electrolyte prepared by dissolving an electrolyte salt in an organic solvent, wherein the non-aqueous electrolyte contains a compound represented by the following formula (1):

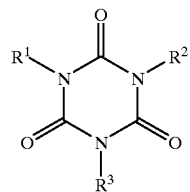

(1)

(in the above formula (1), $R^1$, $R^2$ and $R^3$ independently represent a hydrogen atom, a halogen atom or a straight chain or branched chain alkyl group). This compound when added to the electrolyte forms a film on the surface of the negative electrode to prevent the electrolyte and the negative electrode from contacting with each other. As a result, occurrence of decomposition reaction of the electrolyte on the negative electrode can be diminished.

DETAILED DESCRIPTION OF THE INVENTION

Figure 1:
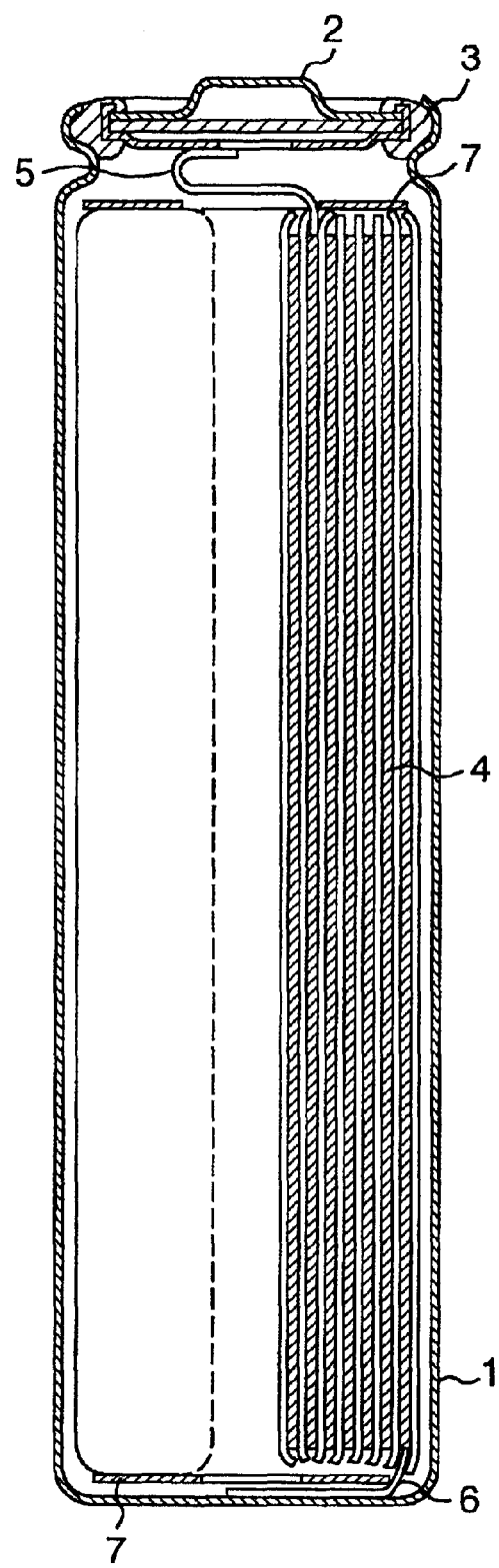
FIG. 1 is a longitudinal sectional view of a cylindrical battery in the examples of the present invention and the comparative examples.

In the present invention, an isocyanuric acid derivative represented by the following formula (1) is added to the non-aqueous electrolyte.

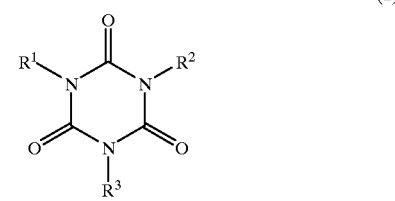

(1)

In the above formula (1), $R^1$, $R^2$ and $R^3$ independently represent a hydrogen atom, a halogen atom or a straight chain or branched chain alkyl group, and the alkyl group is preferred.

Unless otherwise notified, the term "alkyl" in this specification preferably means a straight chain or branched chain alkyl of 1–30 carbon atoms which is substituted or unsubstituted or a cycloalkyl of 3–30 carbon atoms which is substituted or unsubstituted, and the straight chain or branched chain alkyl is preferred. These groups can be saturated or unsaturated, and are preferably saturated. Preferred alkyl groups are straight chain or branched chain alkyl groups of 1–10 carbon atoms which are substituted or unsubstituted, and specifically are methyl group, ethyl group, propyl group, butyl group, pentyl group, hexyl group, heptyl group, octyl group, nonyl group and decyl group. More preferred are straight chain or branched chain alkyl groups of 1–6 carbon atoms which are substituted or unsubstituted, and specifically are methyl group, ethyl group, propyl group, butyl group, pentyl group and hexyl group.

The alkyl groups may contain hydroxyl group, carboxyl group, aldehyde group, carbonyl group, ether linkage or ester linkage, namely, may be substituted with hydroxyl group, carboxyl group, aldehyde group, —COR' group, —OR' group, —O—CO—R' group or —CO—OR' group where R' represents the above-mentioned alkyl groups, and more preferably unsubstituted alkyl groups of 1–6 carbon atoms and further preferably unsubstituted alkyl groups of 1–3 carbon atoms.

Examples of the compounds represented by the formula (1) are isocyanuric acid, isocyanuric acid monochloride, isocyanuric acid dichloride, isocyanuric acid trischloride, mono(carboxymethyl) isocyanurate, di(carboxymethyl) isocyanurate, tris(carboxymethyl) isocyanurate, mono(2-carboxyethyl) isocyanurate, di(2-carboxyethyl) isocyanurate, tris(2-carboxyethyl) isocyanurate, mono(3-carboxypropyl) isocyanurate, di(3-carboxypropyl) isocyanurate, tris(3-carboxypropyl) isocyanurate, mono(2-carboxypropyl) isocyanurate, di(2-carboxypropyl) isocyanurate, tris(2-carboxypropyl) isocyanurate, mono(1- carboxypropyl) isocyanurate, di(1-carboxypropyl) isocyanurate, tris(1-carboxypropyl) isocyanurate, and derivatives of them, for example, alkoxy derivatives such as mono(methoxycarboxymethyl) isocyanurate, di(methoxycarboxymethyl) isocyanurate, tris(methoxycarboxymethyl) isocyanurate, mono(2-methoxycarboxyethyl) isocyanurate, di(2-methoxycarboxyethyl) isocyanurate, tris(2-methoxycarboxyethyl) isocyanurate, mono(3-methoxycarboxypropyl) isocyanurate, di(3-methoxycarboxypropyl) isocyanurate, tris(3-methoxycarboxypropyl) isocyanurate, mono(2-methoxycarboxypropyl) isocyanurate, di(2-methoxycarboxypropyl) isocyanurate, tris(2-methoxycarboxypropyl) isocyanurate, mono(1-methoxycarboxypropyl) isocyanurate, di(1-methoxycarboxypropyl) isocyanurate, tris(1-methoxycarboxypropyl) isocyanurate, mono(ethoxycarboxymethyl) isocyanurate, di(ethoxycarboxymethyl) isocyanurate, tris(ethoxycarboxymethyl) isocyanurate, mono(2-ethoxycarboxyethyl) isocyanurate, di(2-ethoxycarboxyethyl) isocyanurate, tris(2-ethoxycarboxyethyl) isocyanurate, mono(3-ethoxycarboxypropyl) isocyanurate, di(3-ethoxycarboxypropyl) isocyanurate, tris(3-ethoxycarboxypropyl) isocyanurate, mono(2-ethoxycarboxypropyl) isocyanurate, di(2-ethoxycarboxypropyl) isocyanurate, tris(2-ethoxycarboxypropyl) isocyanurate, mono(1-ethoxycarboxypropyl) isocyanurate, di(1-ethoxycarboxypropyl) isocyanurate, and tris(1-ethoxycarboxypropyl) isocyanurate, and the like.

A preferred embodiment of the present invention is that the compound is represented by the formula (1) where $R^1$, $R^2$ and $R^3$ independently of one another are each an alkyl group having a carboxyl group or an alkyl group containing an ester linkage. A more preferred embodiment is that the compound represented by the formula (1) is tris(2-carboxyethyl) isocyanurate or a derivative thereof, preferably an alkoxy derivative, more preferably tris(2-methoxycarboxyethyl) isocyanurate. This is because when one of the compounds represented by the formula (1) forms a film on the negative electrode, if the organic compound has a carboxyl group, it positively reacts with active sites on the negative electrode and, hence, reactivity of the active sites on the negative electrode lowers to make it possible to further inhibit the decomposition of the electrolyte on the negative electrode. In the case of having an ester linkage, the same effect can also be obtained by carboxyl group or hydroxyl group produced upon decomposition of the ester linkage.

Amount of the compound added is preferably not less than 0.01% by weight and less than 20% by weight based on the weight of the non-aqueous electrolyte.

The non-aqueous electrolyte of the present invention contains an organic solvent and an electrolyte salt which is soluble in the solvent. As the organic solvent, mention may be made of non-protonic organic solvents, for example, cyclic carbonic acid esters such as ethylene carbonate (EC), propylene carbonate (PC) and butylene carbonate (BC), non-cyclic carbonic acid esters such as dimethyl carbonate (DMC), diethyl carbonate (DEC), ethylmethyl carbonate (EMC) and dipropyl carbonate (DPC), aliphatic carboxylic acid esters such as methyl formate, methyl acetate, methyl propionate and ethyl propionate, cyclic carboxylic acid esters such as γ-butyrolactone and γ-valerolactone, non-cyclic ethers such as 1,2-dimethoxyethane (DME), 1,2-diethoxyethane (DEE) and ethoxymethoxyethane (EME), cyclic ethers such as tetrahydrofuran and 2-methyltetrahydrofuran, dimethyl sulfoxide, 1,3-dioxolan, formamide, acetamide, dimethylformamide, dioxolan, acetonitrile, propylnitrile, nitromethane, ethyl monoglyme, phosphoric acid esters such as trimethyl phosphate and thiethyl phosphate, trimethoxymethane, dioxolan derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, and N-methylpyrrolidone. These are used each alone or in admixture of two or more. Preferably, at least one organic compound selected from the group consisting of the carbonic acid esters, the cyclic carboxylic acid esters and the phosphoric acid esters is contained in the non-aqueous electrolyte. Especially preferably, at least one organic compound selected from the group consisting of the cyclic carboxylic acid esters and the phosphoric acid esters is contained in the non-aqueous electrolyte. This is because flash point and ignition point of these compounds are very high and, hence, batteries higher in safety can be obtained.

As the electrolyte salts dissolved in these organic solvents, mention may be made of, for example, $LiClO_4$, $LiBF_4$, $LiPF_6$, $LiAlCl_4$, $LiSbF_6$, LiSCN, LiCl, $LiCF_3SO_3$, $LiCF_3CO_2$, $LiAsF_6$, $LiB_{10}Cl_{10}$, lithium salts of lower aliphatic carboxylic acids, LiBr, LiI, chloroborane lithium, lithium tetraphenylborate, salts having an imide skeleton $((C_2F_5SO_2)_2NLi, (CF_3SO_2)_2NLi, (CF_3SO_2)(C_4F_9SO_2)NLi$, etc.), and salts having a methide skeleton $((CF_3SO_2)_3CLi$, etc.). These may be used each alone or in combination of two or more in the electrolyte and the like, and $LiPF_6$ is especially preferred. Amount of the lithium salts dissolved in the non-aqueous solvent is not especially limited, but preferably is 0.2–2 mol/l, especially preferably 0.5–1.5 mol/l.

Furthermore, in order to make the electrolyte nonflammable, halogen-containing solvents such as carbon tetrachloride and ethylene trifluoride chloride can be contained in the electrolyte. Moreover, carbon dioxide can be contained in the electrolyte for giving suitability for high-temperature storage.

Furthermore, there may be used a gel electrolyte comprising an organic solid electrolyte which contains the above non-aqueous electrolyte. As the organic solid electrolyte, effective are polymeric matrix materials such as polyethylene oxide, polypropylene oxide, polyphosphazene, polyaziridine, polyethylene sulfide, polyvinyl alcohol, polyvinylidene fluoride and polyhexafluoropropylene, and derivatives, mixtures and composite thereof. Especially preferred are copolymers of vinylidene fluoride and hexafluoropropylene and mixtures of polyvinylidene fluoride and polyethylene oxide.

The negative electrode materials used in the present invention may be compounds capable of occluding or discharging lithium ions, such as lithium, lithium alloys, alloys, intermetallic compounds, carbon materials, organic compounds, inorganic compounds, metal complexes, and organic high molecular compounds. These may be used each alone or in combination.

The effect of the present invention is especially high when the negative electrode materials are carbon materials. Examples of the carbonaceous materials are cokes, pyrolytic carbons, natural graphite, artificial graphite, mesocarbon microbeads, graphitized mesophase spherules, vapor deposited carbons, glassy carbons, carbon fibers (polyacrylonitrile fibers, pitch fibers, cellulose fibers and vapor deposited carbon fibers), amorphous carbons, and carbons prepared by firing organic materials. These may be used each alone or in combination. Among them, preferred are graphite materials such as those obtained by graphitizing mesophase spherules at high temperatures, natural graphite and artificial graphite, and especially preferred are graphitized mesophase spherules.

As the positive electrode active materials, there may be used those which can be generally used for non-aqueous electrolyte batteries. Examples thereof are $Li_xCoO_2$, $Li_xNiO_2$, $Li_xMnO_2$, and $Li_xMn_2O_4$ ($0<x\leq1.2$).

Having thus generally described the present invention, the following specific examples are provided to illustrate the invention. The examples are not intended to limit the scope of the invention in any way.

EXAMPLES

Examples of the present invention will be explained referring to the drawings.

Example 1

FIG. 1 is a longitudinal sectional view of a cylindrical battery used in this example. In FIG. 1, 1 indicates a battery case made by working a stainless steel plate having resistance to organic electrolyte, 2 indicates a sealing plate provided with a safety valve, and 3 indicates an insulation packing. The numeral 4 indicates an electrode plate group, and a positive electrode and a negative electrode between which a separator is disposed are rolled a plurality of times into a spiral form and inserted in the case 1. A positive electrode lead 5 is drawn from the positive electrode and connected to the sealing plate 2, and a negative electrode lead 6 is drawn from the negative electrode and connected to the bottom of the battery case 1. The numeral 7 indicates an insulation ring, which is provided at the upper and lower portion of the electrode plate group 4. The positive electrode, the negative electrode, and others will be explained in detail below.

As for the positive electrode, a positive electrode mix paste was prepared by mixing an $LiCoO_2$ powder synthesized by firing a mixture of $Li_2CO_3$ and $Co_3O_4$ at 900° C. for 10 hours with 3% of acetylene black and 7% of a fluorocarbon resin binder based on the weight of the $LiCoO_2$ powder, and suspending the mixture in an aqueous carboxymethyl cellulose solution to prepare a paste. The resulting positive electrode mix paste was coated on an aluminum foil of 30 μm in thickness and dried, followed by rolling to make a positive electrode plate of 0.18 mm in thickness, 37 mm in width and 390 mm in length.

For the negative electrode, mesophase spherules graphitized at a high temperature of 2800° C. (hereinafter referred to as "mesophase graphite") was used. This mesophase graphite was mixed with 5% of a styrene-butadiene rubber based on the weight of the mesophase graphite and then the mixture was suspended in an aqueous carboxymethyl cellulose solution to prepare a paste. This negative electrode mix paste was coated on both sides of a Cu foil of 0.02 mm in thickness and dried, followed by rolling to make a negative electrode plate of 0.20 mm in thickness, 39 mm in width and 420 mm in length.

An aluminum lead was attached to the positive electrode plate and a nickel lead was attached to the negative electrode plate. A polypropylene separator of 0.025 mm in thickness, 45 mm in width and 950 mm in length disposed between the positive electrode plate and the negative electrode plate were rolled into a spiral form and inserted in a battery case of 17.0 mm in diameter and 50.0 mm in height.

The electrolyte used was one prepared by dissolving 1 mol/liter of $LiPF_6$ in a solvent comprising a mixture of ethylene carbonate and diethyl carbonate at a volume ratio of 30:70, followed by adding thereto tris(2-carboxyethyl) isocyanurate in an amount of 0.2% by weight, 0.5% by weight or 1.0% by weight based on the electrolyte. The electrolyte was poured into the battery case, and then the case was sealed to make Batteries 1–3 of the present invention.

Example 2

Cylindrical batteries of spiral type were made in the same manner as in Example 1, except that tris(2-methoxycarboxyethyl) isocyanurate was used in place of tris(2-carboxyethyl) isocyanurate. These were referred to as Batteries 4–6 of the present invention.

Example 3

Cylindrical batteries of spiral type were made in the same manner as in Example 1, except that the electrolyte used was prepared by dissolving 1 mol/liter of $LiPF_6$ in γ-butyrolactone and adding thereto tris(2-carboxyethyl) isocyanurate in an amount of 0.2% by weight, 0.5% by weight or 1.0% by weight based on the electrolyte. The resulting batteries were referred to as Batteries 7–9 of the present invention.

Example 4

Cylindrical batteries of spiral type were made in the same manner as in Example 3, except that tris(2-methoxycarboxyethyl) isocyanurate was used in place of tris(2-carboxyethyl) isocyanurate. These batteries were referred to as Batteries 10–12 of the present invention.

Example 5

Cylindrical batteries of spiral type were made in the same manner as in Example 1, except that the electrolyte used was prepared by dissolving 1 mol/liter of $LiPF_6$ in trimethyl phosphate and adding thereto tris(2-carboxyethyl) isocyanurate in an amount of 0.2% by weight, 0.5% by weight or 1.0% by weight based on the electrolyte. These batteries were referred to as Batteries 13–15 of the present invention.

Example 6

Cylindrical batteries of spiral type were made in the same manner as in Example 5, except that tris(2-methoxycarboxyethyl) isocyanurate was used in place of tris(2-carboxyethyl) isocyanurate. These batteries were referred to as Batteries 16–18 of the present invention.

Comparative Example 1

A cylindrical battery of spiral type was made in the same manner as in Example 1, except that tris(2-carboxyethyl) isocyanurate was not added. This battery was referred to as comparative Battery 1.

Comparative Example 2

A cylindrical battery of spiral type was made in the same manner as in Example 3, except that tris(2-carboxyethyl) isocyanurate was not added. This battery was referred to as comparative Battery 2.

Comparative Example 3

A cylindrical battery of spiral type was made in the same manner as in Example 5, except that tris(2-carboxyethyl) isocyanurate was not added. This battery was referred to as comparative Battery 3.

Then, five cells each of the Batteries 1–18 of the present invention and the comparative Batteries 1–3 were subjected to constant voltage charging at a limit current of 500 mA and a charging voltage of 4.2 V for a charging time of 2 hours at an environmental temperature of 20° C., and discharge characteristics of these batteries at 1A were examined in charging state. Then, these batteries in charging state were subjected to storage test at 80° C. for 5 days, and the batteries after stored were also subjected to charging and discharging under the same conditions as above and capacity recovery rate after storage (capacity after storage/capacity before storage×100(%)) was obtained. The results are shown in Table 1.

TABLE 1

|  | Electrolytes | Additives | Addition amount (wt %) | Capacity recovery rate after storage |
|---|---|---|---|---|
| Battery 1 | 1.0M LiPF$_6$ | Tris(2-carboxy- | 0.2 | 82.4% |
| Battery 2 | EC/DEC | ethyl)- | 0.5 | 89.8% |
| Battery 3 | (30/70) | isocyanurate | 1.0 | 90.1% |
| Battery 4 | (vol %) | Tris(2- | 0.2 | 83.3% |
| Battery 5 |  | methoxy- | 0.5 | 90.1% |
| Battery 6 |  | carboxyethyl)-isocyanaurate | 1.0 | 90.3% |
| Comparative Battery 1 |  |  |  | 66.5% |
| Battery 7 | 1.0M LiPF$_6$ | Tris(2-carboxy- | 0.2 | 82.1% |
| Battery 8 | γ-Butyrolactone | ethyl)- | 0.5 | 83.5% |
| Battery 9 |  | isocyanurate | 1.0 | 83.9% |
| Battery 10 |  | Tris(2- | 0.2 | 85.7% |
| Battery 11 |  | methoxy- | 0.5 | 87.1% |
| Battery 12 |  | carboxyethyl)-isocyanurate | 1.0 | 87.9% |
| Comparative Battery 2 |  |  |  | 45.3% |
| Battery 13 | 1.0M LiPF$_6$ | Tris(2-carboxy- | 0.2 | 73.5% |
| Battery 14 | Trimethyl | ethyl)- | 0.5 | 77.9% |
| Battery 15 | phosphate | isocyanurate | 1.0 | 80.3% |
| Battery 16 |  | Tris(2- | 0.2 | 77.3% |
| Battery 17 |  | methoxy- | 0.5 | 79.8% |
| Battery 18 |  | carboxyethyl)-isocyanurate | 1.0 | 81.2% |
| Comparative Battery 3 |  |  |  | 38.7% |

From Table 1, it can be seen that the capacity recovery rates after storage of Batteries 1–18 of the present invention were much superior to those of the comparative Batteries 1–3 to which the additives were not added, and thus the organic compounds added in the Examples were effective.

Example 7

Figure 2:
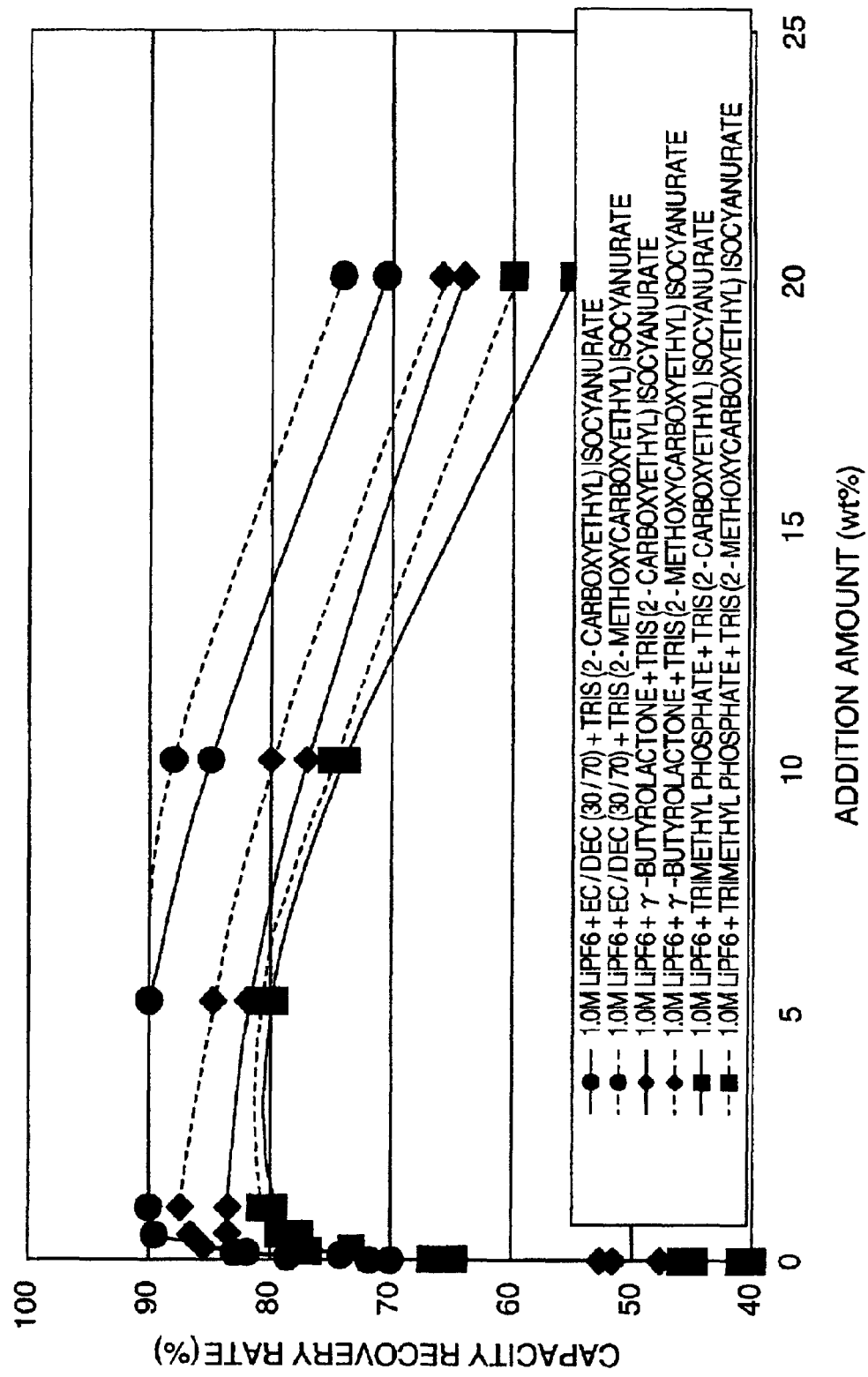
FIG. 2 is a graph which shows relations between amounts of the additives and capacity recovery rate.

Furthermore, investigation was conducted on contents of the organic compounds, and the results are shown in FIG. 2. The batteries were made in the same manner as in Examples 1–6, except that the contents of the organic compounds were changed, and the tests were conducted in the same manner as above. As is clear from FIG. 2, an effect on capacity recovery rate after storage was already seen at 0.01% by weight. However, the discharge characteristics per se began to become inferior at 20% by weight. It is considered that this is because the electric conductivity of the electrolyte per se decreased. Thus, it is preferred that the content of the compound represented by the formula (1) is less than 20% by weight.

As explained above, according to the present invention, batteries excellent in storage characteristics and high in reliability can be provided because at least one compound added forms a film on the surface of the negative electrode to prevent the electrolyte and the negative electrode from contacting with each other, and, thus, occurrence of decomposition reaction of the electrolyte can be diminished.

What is claimed is:

1. A non-aqueous electrolyte battery comprising:
   a positive electrode,
   a negative electrode, and
   a non-aqueous electrolyte comprising an electrolyte salt dissolved in an organic solvent, wherein the non-aqueous electrolyte comprises a compound represented by the following formula (1):

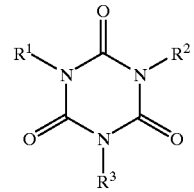

(1)

wherein in the above formula (1), each of $R^1$, $R^2$ and $R^3$ are independently selected from the group consisting of a hydrogen atom, a halogen atom and a straight chain or branched chain alkyl group, wherein said compound forms a film on a surface of said negative electrode; and wherein at least one of $R^1$, $R^2$ or $R^3$ is a straight chain alkyl group containing a carboxyl group or a branched chain alkyl group containing a carboxyl group.

2. A non-aqueous electrolyte battery according to claim 1, wherein said compound is at least one compound selected from the group consisting of tris(2-carboxyethyl) isocyanurate.

3. A non-aqueous electrolyte battery according to claim 1, wherein said compound is tris(2-methoxycarboxyethyl) isocyanurate.

4. A non-aqueous electrolyte battery according to claim 1, wherein said organic solvent is at least one organic compound selected from the group consisting of carbonic acid esters, cyclic carboxylic acid esters and phosphoric acid esters.

5. A non-aqueous electrolyte battery according to claim 1, wherein the content of the compound is not less than 0.01% by weight and less than 20% by weight based on the weight of the non-aqueous electrolyte.

6. A non-aqueous electrolyte battery according to claim 1, wherein the negative electrode comprises a carbon material.

7. A non-aqueous electrolyte battery according to claim 6, wherein the carbon material is a graphitized mesophase spherule.

8. A non-aqueous electrolyte comprising an organic solvent and an electrolyte salt, wherein the non-aqueous electrolyte comprises a compound represented by the following formula (1):

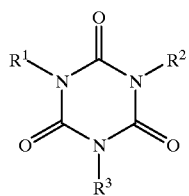
(1)

wherein in the above formula (1), each of $R^1$, $R^2$ and $R^3$ are independently selected from the group consisting of a hydrogen atom, a halogen atom and a straight chain or branched chain alkyl group, wherein when said compound is added to the electrolyte, said compound forms a film; and wherein at least one of $R^1$, $R^2$ or $R^3$ is a straight chain alkyl group containing a carboxyl group or a branched chain alkyl group containing a carboxyl group.

9. A non-aqueous electrolyte according to claim 8, wherein said compound is at least one compound selected from the group consisting of tris(2-carboxyethyl) isocyanurate.

10. A non-aqueous electrolyte according to claim 8, wherein said compound is tris(2-methoxycarboxyethyl) isocyanurate.

11. A non-aqueous electrolyte according to claim 8, wherein said organic solvent is at least one organic compound selected from the group consisting of carbonic acid esters, cyclic carboxylic acid esters and phosphoric acid esters.

12. A non-aqueous electrolyte according to claim 8, wherein the content of the compound is not less than 0.01% by weight and less than 20% by weight based on the weight of the non-aqueous electrolyte.

* * * * *